US012618810B2

(12) United States Patent
Stöbener et al.

(10) Patent No.: US 12,618,810 B2
(45) Date of Patent: May 5, 2026

(54) SYSTEM FOR SEPARATING AN ANALYTE FROM A SAMPLE

(71) Applicant: Thermo Fisher Scientific (Bremen) GmbH, Bremen (DE)

(72) Inventors: Nils Stöbener, Bremen (DE); Johannes Schwieters, Bremen (DE); Andreas Hilkert, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 321 days.

(21) Appl. No.: 18/575,025

(22) PCT Filed: Jul. 1, 2022

(86) PCT No.: PCT/EP2022/068329
§ 371 (c)(1),
(2) Date: Dec. 28, 2023

(87) PCT Pub. No.: WO2023/275383
PCT Pub. Date: Jan. 5, 2023

(65) Prior Publication Data
US 2024/0302332 A1 Sep. 12, 2024

(30) Foreign Application Priority Data

Jul. 2, 2021 (GB) ..................................... 2109627

(51) Int. Cl.
*G01N 30/02* (2006.01)
*G01N 1/40* (2006.01)
(Continued)

(52) U.S. Cl.
CPC .............. *G01N 30/02* (2013.01); *G01N 1/40* (2013.01); *G01N 30/14* (2013.01); *G01N 30/88* (2013.01);
(Continued)

(58) Field of Classification Search
CPC ........ G01N 30/02; G01N 30/14; G01N 30/88; G01N 1/40; G01N 2030/025; G01N 2030/8868
(Continued)

(56) References Cited

U.S. PATENT DOCUMENTS 4,215,563 A * 8/1980 Clardy ............... G01N 30/8665
73/23.35
5,720,798 A 2/1998 Nickerson et al.
(Continued)

FOREIGN PATENT DOCUMENTS

GB 2537915 B 8/2019
WO 2021061904 A1 4/2021

OTHER PUBLICATIONS

Fry et al., "Cryoflow: Cryofocusing nanomole amounts of CO2, N2, and SO2 from an elemental analyzer for stable isotopic analysis," Rapid Communications in Mass Spectrometry, 10(8): 953-958 (1996).
(Continued)

*Primary Examiner* — Nathaniel T Woodward
(74) *Attorney, Agent, or Firm* — Klarquist Sparkman, LLP

(57) ABSTRACT

A system comprises a separator that separates an analyte from the sample, an analyser, downstream of the separator, configured to obtain measurements indicative of a quantity of the analyte in the sample. A bypass line provides a first fraction of the sample to the analyser for measurement without passing through the separator. A controller receives a measurement obtained by the analyser on the first fraction of the sample, the measurement indicating that the first fraction of the sample received via the bypass line comprises a threshold quantity of the analyte. Activation of the separator is based on the received measurement. A second fraction of the sample is provided to the analyser without (Continued)

passing through the bypass line such that the first fraction of the sample arrives at the analyser before the second fraction of the sample arrives at the separator.

32 Claims, 6 Drawing Sheets

(51) Int. Cl.
 *G01N 30/14* (2006.01)
 *G01N 30/88* (2006.01)

(52) U.S. Cl.
 CPC .................. *G01N 2030/025* (2013.01); *G01N 2030/8868* (2013.01)

(58) Field of Classification Search
 USPC ........................................................ 73/23.37
 See application file for complete search history.

(56) References Cited

U.S. PATENT DOCUMENTS

| | | | | |
|---|---|---|---|---|
| 7,490,506 | B2 * | 2/2009 | Chaintreau | .......... G01N 30/465 73/23.35 |
| 8,402,814 | B2 * | 3/2013 | Hatscher | ............. H01J 49/0404 250/281 |
| 10,115,577 | B1 * | 10/2018 | Eiler | ................... H01J 49/0422 |
| 2010/0176043 | A1 * | 7/2010 | Wheat | ................... G01N 30/34 210/198.2 |

OTHER PUBLICATIONS

Combined Search and Examination Report under Sections 17 & 18(3) for related Application No. GB 2109627.6, dated Apr. 29, 2022, 10 pages.
International Search Report and Written Opinion for related Application No. PCT/EP2022/068329, dated Sep. 30, 2022, 12 pages.

* cited by examiner

SYSTEM FOR SEPARATING AN ANALYTE FROM A SAMPLE

CROSS REFERENCE TO RELATED APPLICATIONS

This is the U.S. National Stage of International Application No. PCT/EP2022/068329, filed Jul. 1, 2022, which was published in English under PCT Article 21 (2), which in turn claims the benefit of GB Application No. 2109627.6 filed Jul. 2, 2021, which is incorporated herein by reference in its entirety.

FIELD

The present disclosure relates to a system for separating an analyte from a sample.

BACKGROUND

A separation process is a method that converts a sample, which may be a mixture of substances, into two or more distinct portions. Various instruments exist that are configured to perform separation processes. Some separation processes exploit differences in chemical properties and/or physical properties (e.g. boiling point, melting point, or other chemical properties) between the constituents of a mixture. Some separation processes use valves or arrangements of valves, which physically divide samples (e.g. to separate samples temporally and/or spatially), without discriminating based on chemical properties and/or physical properties of the samples.

Often, separation is employed in order to obtain a portion or subset of the original sample that is relatively enriched in a species of interest or analyte. When this occurs, another portion of the sample that is relatively depleted in the analyte is also produced. This further portion may be a waste product or it may comprise another species that is of interest. In some cases, separation processes seek to divide a sample fully, into almost pure, isolated constituents, while in other cases, partial separation is acceptable or desirable.

Scientific instruments and analytical instruments are often used to characterise the properties of a particular species of interest or analyte. In such instruments, separation can be employed to enhance the measurements that are obtained. If an analyte is present in a relatively small quantity in a sample (e.g. the analyte is only 1% of the total sample), then any measurements obtained based on the relatively small quantity of analyte may be clouded by interfering species in the sample (e.g. measurement artefacts arising due to the other 99% of the sample). Separation can therefore help to reduce the effects of interference or background noise in scientific and analytical instruments.

Some separation systems use cryotraps to separate analyte from a sample. For example, U.S. Pat. No. 7,490,506 describes a detector means provided upstream of a first cooling portion of a conduit means, so as to allow control of the residence time of a chemical sample fluid stream in a cooled portion or portions of the conduit means. U.S. Pat. No. 7,490,506 also describes allowing thermal modulation of a fluid stream of a chemical mixture eluted from a first GC column that one wishes to completely separate in a second GC column.

U.S. Pat. No. 5,720,798 describes the use of analyte traps. A detector is mounted on an analyte trap so as to analyse the headspace of a sample passing through the analyte trap. The detector generates a control signal that is employed for opening and closing port valves, to effect the analytical procedure known as "heart-cutting" or "Dean switching", in which only a portion of analyte desorbed off a trap is directed to a gas chromatograph for analysis.

U.S. Pat. No. 10,115,577 describes isotope ratio mass spectrometry. Isotope ratio mass spectrometry is effected by: injecting a sample for analysis into a gas chromatography column; directing an effluent from the gas chromatography column to a switching arrangement; and selecting a configuration of the switching arrangement, such that: in a first mode, the effluent from the gas chromatography column is provided as an input to a peak broadener; and in a second mode, an effluent from the peak broadener is provided to a mass spectrometer for isotope ratio mass spectrometry without the effluent from the gas chromatography column being provided as an input to the peak broadener.

While known systems for separating samples perform adequately in many scenarios, some suffer from contamination or discard unacceptable amounts of analyte, which be problematic in analytical instruments (e.g. spectroscopy, mass spectrometry (MS), electrochemical analysis, elemental analysis (EA), and thermal analysis). Moreover, separation systems can be complex and difficult to configure, involving numerous detectors and analysers, requiring various interacting components and control circuitry. This can lead to there being numerous potential modes of failure. It is an object of this disclosure to address these and other problems in separation systems.

SUMMARY

Against this background and in accordance with a first aspect, there is provided a system according to claim 1. In a second aspect, there is provided a method according to claim 30. In general terms, the disclosure provides a system for separating an analyte from a sample, comprising: a separator configured to separate the analyte from the sample; an analyser configured to obtain measurements indicative of a quantity of the analyte in the sample, wherein the analyser is downstream of the separator; a bypass line configured to provide a first fraction of the sample to the analyser for measurement without passing through the separator; and a controller configured to: receive a measurement obtained by the analyser on the first fraction of the sample received via the bypass line, the measurement indicating that the first fraction of the sample received via the bypass line comprises a threshold quantity of the analyte; and control activation of the separator based on the received measurement.

One advantage of such system is that separation of sample species (e.g. solid, liquid or gas) can performed with improved timings due to the bypass line, independent of sample size. The arrangements of the disclosure provide systems having a reduced need for manual optimisation of trapping timings. Moreover, such systems can ensure that separation timing does not need to be readjusted when sample sizes change, because the bypass lines described herein can be used to monitor the presence of analyte in any sample continuously. As a result, the systems described herein can increase automation, leave less room for error and thereby improve the accuracy of measurements. Moreover, a single analyser can be used to obtain measurements used for controlling a separator and to provide analytical measurements, obviating the need for additional upstream detectors. This provides systems that can be manufactured and configured quickly, easily and cost-effectively.

A particular analyte of interest and for which the timing of separation is important is $N_2$. As $N_2$ is highly abundant in the atmosphere, it can cause particular problems by entering into systems through small leaks. Thus, improving separation timing is highly advantageous when measuring $N_2$. Nevertheless, interfering peaks are a general problem and the systems described herein can advantageously also separate $CO_2$, CO, $SO_2$, and $H_2$, or various gaseous mixtures such as $CO_2$ and He. Moreover, it is also possible to separate $SF_6$, $CH_4$; $NO_x$ (x=1, 2, or 0.5); Ar; and/or $O_2$. The disclosure is not limited to gases and other forms of matter, such as liquids, solids, slurries and suspensions may also be separated.

The systems disclosed herein are particularly advantageous in the context of isotope ratio measurements, or any other scenario requiring precise control over samples. A small fraction of sample (e.g. 1% or 2%) received via a bypass is adequate for estimating concentration and activating a separator (particularly when an IRMS is used, due to its high sensitivity), meaning that the vast majority of a sample can be used for precise measurements, such as isotope ratio measurements. The bypass lines described herein can help to avoid the loss of the first seconds of a peak arriving in a separator. In isotope ratio mass spectrometry (IRMS) measurements, for example, integration over a whole peak is important for accurate isotope ratio measurements (to prevent fractionation), so the bypass lines described herein help to ensure accurate IRMS measurements can be taken due to the effective separation of samples.

Throughout this disclosure, the expression "a portion of a sample" is used to refer to a subset of a sample that has been divided by a separator that is controlled based on measurements obtained using a bypass line. In contrast, other means of dividing samples are disclosed, such as splitters, which are not controlled by a controller in this way. Throughout this disclosure, these other means of dividing samples are described as dividing a sample into "fractions of a sample". Therefore, in the systems of the present disclosure, a sample is divided into first and second (or more) fractions. The first fraction of the sample is provided to an analyser via a bypass line to provide measurements that are used to generate a control signal, and the second fraction (or further fractions) is separated by the separator controlled by such control signals. The separator controlled by such control signals causes the second fraction (or fractions) of the sample to be separated into distinct portions (e.g. first and second portions).

The disclosure provides a number of benefits including: automation of the trapping procedure based on signal readbacks; sample peaks of different sizes and durations can be trapped with the same efficiency; a cost-effective, reliable and relatively cheap system is provided due to the use of one analyser for two purposes; and the ability to separate samples with peak tails that are hard to detect is enhanced, by using of the peak height from the monitoring flow to determine a trapping time end. These and other advantages of the systems described herein will be apparent to the skilled reader from the disclosure.

LISTING OF FIGURES

The present disclosure will now be described by way of example, with reference to the accompanying figures, in which.

DETAILED DESCRIPTION

Figure 1:
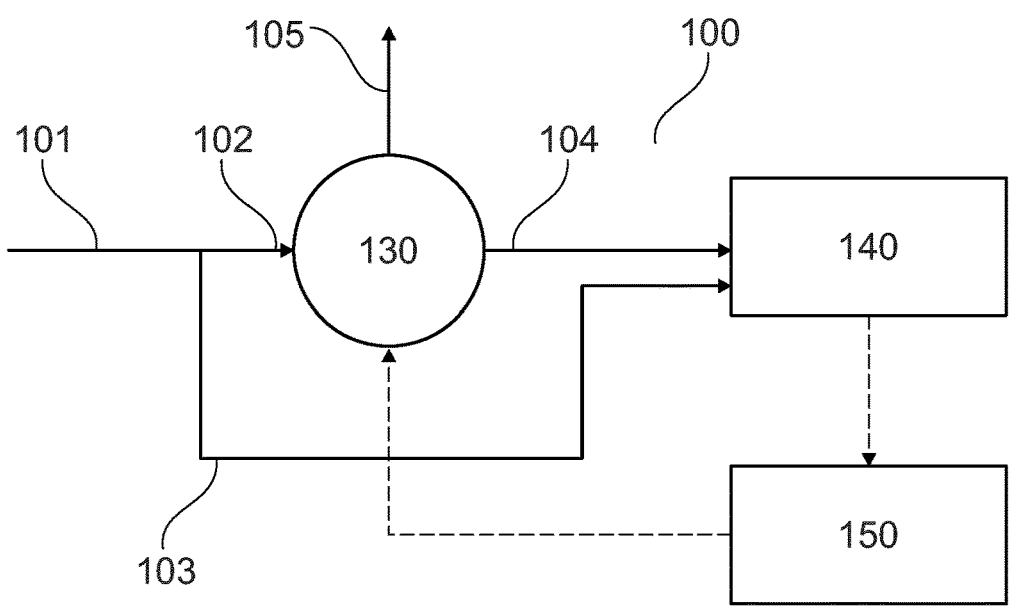
FIG. 1 shows schematically a system for separating an analyte from a sample according to a first embodiment.

In FIG. 1, there is shown a system 100 for separating an analyte from a sample according to a first embodiment. The system 100 comprises a plurality of conduits 101-105, through which a sample passes as the sample is separated by the system 100. The system comprises a separator 130, which acts to separate analyte from the sample and an analyser 140, which takes measurements on the sample. The system further comprises a controller 150, which is capable of controlling the separator 130 and receiving measurements from the analyser 140.

In particular, the system comprises a first conduit 101 that receives the sample from a sample source (which is not depicted). The first conduit 101 guides the sample to a second conduit 102 and a third conduit 103. The third conduit 103 transports a first fraction of the sample directly to the analyser 140 without passing through the separator 130, while the second conduit 102 transports a second fraction of the sample to the separator 130.

Two additional conduits are connected to the separator 130. A fourth conduit 104 transports a portion of the sample emerging from the separator 130 to the analyser 140. A fifth conduit 105 can be used to transport another portion of the sample emerging from the separator 130 to elsewhere. For example, the fifth conduit 105 may be used to discard of certain species that are not intended to be transported to the analyser 140.

In use, the sample passes through the first conduit 101 and a first fraction of the sample is transported by the third conduit 103 to the analyser 140 for measurement without passing through the separator 130. Thus, the third conduit 103 acts as a bypass line, which allows a monitoring flow to be measured by the analyser 140. The analyser 140 performs a measurement on the first fraction of the sample, which provides an indication of how much of a particular analyte is present in the sample received via the third conduit 103. This measurement is communicated to the controller 150, as indicated by the arrow between the analyser 140 and the controller 150. The controller 150 uses the received measurement to control the operation of the separator 130, as indicated by the arrow between the controller 150 and the separator 130. For instance, the controller 150 can activate or deactivate the separator 130. Moreover, the controller can adjust the degree of activation of the separator 130 (e.g. to change the separator 130 from being in a maximally- or minimally-activated state to a partially activated state) based on the measurement received from the analyser 140.

While a first fraction of the sample passes through the first conduit 101 and into the third conduit 103, a second fraction of the sample is transported directly to the separator 130 via the second conduit 102. In general terms, the systems described herein may comprise a splitter upstream of a separator, an analyser and a bypass line. Such a splitter may be configured to split the sample into the first and section fractions of the sample. Various splitting means can be used.

When activated, the separator 130 acts to separate the second fraction of the sample into two portions. The activation of the separator 130 and hence the amount and composition of the two portions are controlled by the controller 150. When certain control signals are received from the controller 150, the separator 130 may be deactivated.

The fourth conduit 104 transports a portion of the sample emerging from the separator 130 to the analyser 140 for measurement. The fifth conduit 105 transports another portion of the sample emerging from the separator 130 to be discarded, stored elsewhere, or transported for analysis elsewhere. In any case, the fifth conduit 105 removes a portion of the sample emerging from the separator 130 from the system 100.

The system 100 of FIG. 1 can be used to advantageous effect in a number of ways. For example, the use of the third conduit 103 as a bypass line allows measurements to be taken on a relatively small amount of sample to generate a control signal. Such a control signal can be used to provide precise control over the operation of the separator 130 using a single analyser 140, without requiring additional upstream analysers (which may also be referred to herein as detectors) to provide control signals.

In some instruments, it can be important to analyse the leading edge of a peak of an analyte or to ensure that all analyte is analysed without introducing unnecessary background measurements. In such cases, it may therefore be advantageous to ensure that separation is commenced as soon as is feasible, in order to ensure that analyte is separated from the sample as soon as it is present in the flow received at the analyser 140. The bypass line of the present disclosure can help to ensure that the separator 130 is activated as soon as a particular measurement is received from the analyser 140. In such cases, the system 100 may be configured so that the first fraction of the sample arrives at the analyser 140 before the second fraction of the sample arrives at the separator 130. In this way, control signals causing the separator 130 to be activated quickly can be provided using a potentially small amount of sample received at the analyser 140 via the third conduit 103. For example, as soon as a small amount of analyte is detected in the first fraction of the sample, the controller 150 can cause activation of the separator 130 based on the measurement or plural measurements received from the analyser 140. Without the bypass line, analyte would pass through a deactivated separator 130 and only then would it be analysed by the analyser 140, at which point, some analyte would already have been lost unnecessarily.

In general terms, therefore, the systems described herein may be configured to provide a second fraction of the sample to an analyser without passing through a bypass line. The systems may be configured such that the second fraction of the sample passes through the separator (and is divided into distinct portions by the separator). In such systems, it can be advantageous to ensure that the first fraction of the sample arrives at the analyser before the second fraction of the sample arrives at the separator, thereby allowing accurate timing of activation and/or deactivation of the separator(s).

For example, this may be achieved by providing a long delay line, such as a long conduit (e.g. by ensuring that conduit 102 is sufficiently long).

Moreover, some types of separator 130 can introduce measurement error and it may therefore be advantageous to ensure that separation is ceased immediately once measurements have been taken. For example, it may be desirable to cease separation to prevent contamination of a sample by the separator 130. Thus, once a satisfactory measurement (e.g. a measurement having acceptable statistical significance, or a measurement that has been made on an acceptably high proportion of a particular analyte peak) has been obtained by the analyser 140, the controller 150 can deactivate the separator 130 to prevent further separation, based on a measurement (or plural measurements) received from the analyser 140. Alternatively, in some scenarios, the composition of a sample changes with time and it may be desirable to analyse the sample only in a particular window of time. The system 100 allows this to be achieved. For example, if a measurement indicates that the composition of the sample has changed over time (e.g. indicating that it is becoming contaminated), then measurement and separation can be ceased to prevent further changes in the composition of the sample from affecting the measurements made.

Hence, the system 100 of FIG. 1 uses one analyser 140 to perform the functions of generating control signals for the separator 130 and to obtain measurements on the analyte. The system 100 can be used to ensure that the timing of activation and/or deactivation of the separator are automatically tailored to the particular analyte of interest, in a way that does not require additional detectors. Moreover, the system 100 of FIG. 1 can reduce contamination in a way that does not require additional detectors to be provided.

In general terms, a controller may be configured to receive a plurality of measurements obtained by the analyser on the first fraction of the sample at different times; and control activation of the separator based on each of the received measurements. For instance, the controllers described herein may be configured to activate a separator at a first time and to deactivate the separator at a second time. The controller may be configured to activate the separator based on a first received measurement indicating that the first fraction of the sample comprises at least a lower threshold quantity of the analyte; and the controller may be configured to deactivate the separator based on a second received measurement, received after the first received measurement, indicating that the first fraction of the sample comprises less than or equal to an upper threshold quantity of the analyte. Thus, precise activation and deactivation of the separator can be achieved, so that an analyte is separated with reduced risk of contamination. Controlling activation of a separator can comprise activating the separator, deactivating the separator, or changing the degree of activation of the separator (e.g. changing the separator from being fully activated/deactivated to partially activated, or changing the activation from being partially activated to fully activated/deactivated). In the case of a cryotrap, controlling the activation of the cryotrap may involve raising or lowering a conduit (e.g. tube) from or into liquid $N_2$ (or any other substance suitable for cooling), or changing the height of the conduit within the cooling substance.

Figure 11:
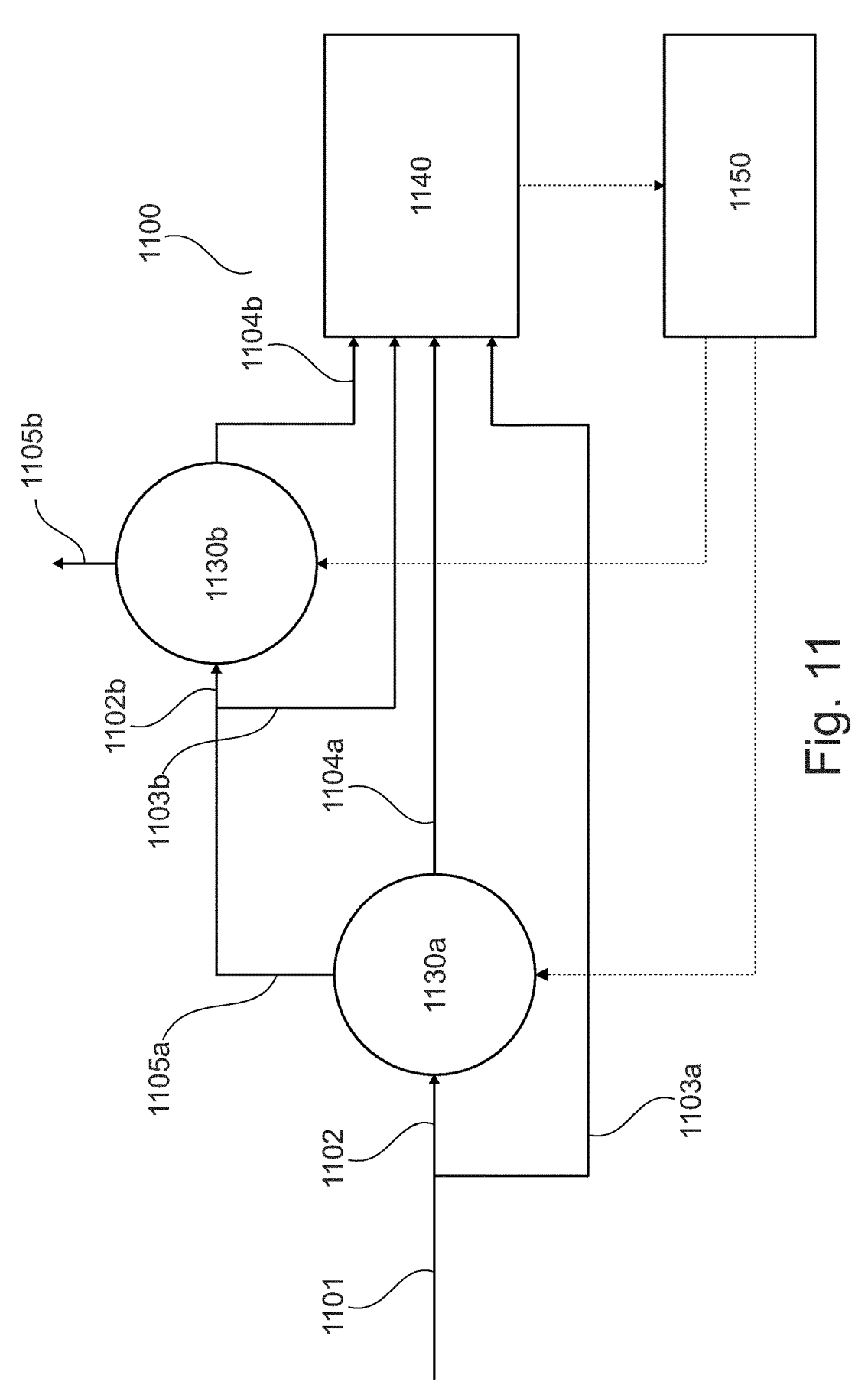
FIG. 11 shows schematically a system for separating an analyte from a sample according to a fourth embodiment.

It will be appreciated that a number of modifications may be made to the system of FIG. 1. For example, the fifth conduit 105 is optional and may be omitted. In some instances, temporal separation of samples is advantageous, and there is no need to discard of waste products or to transport a portion of the sample elsewhere. Alternatively, the system 100 of FIG. 1 comprises only one analyser 140, but further analysers could be placed downstream of the fifth conduit 105. Thus, a cascading arrangement of separators, each controlled by the controller based on measurements received via a respective bypass line, may be provided. Such an arrangement is shown in FIG. 11, which is described in further detail below.

The conduits 101-105 of the system 100 can be any structure suitable for transporting the sample or at least a fraction or a portion of the sample between the different components of the system. For example, the conduits 101-105 could be a pipe, duct, channel, hose, tube, or any combination thereof. The subsequent embodiments described herein omit a detailed discussion of the conduits for brevity. Nevertheless, it will be understood that where a sample, a fraction of a sample or a portion of a sample is described as moving between two components, an appropriate conduit can be provided between those two components. The system 100 is capable of separation of various types of samples, such as solids, liquids or gases. The samples may also be a combination of types of matter, such as a suspension, a slurry or an aerosol. In some instances, solids (e.g. particles, grains or seeds) may be transported (e.g. on a conveyor belt) and can be separated using the systems described herein, with a fraction of the solids being taken to an analyser via a bypass line and the other fraction being separated by a separator. In such cases, conveyor systems rather than conduits may be used.

A particular scenario in which similar systems to the system 100 can advantageously be used is in Gas Isotope Ratio Mass Spectrometry-Elemental Analysis. For instance, some embodiments of this disclosure relate to the introduction of gaseous samples into an isotope ratio mass spectrometer (IRMS). Typical samples include species such as $CO_2$, $N_2$, CO, $SO_2$, $H_2$, both in pure form and in a gas mixture, such as $CO_2$ in He.

Commonly, these gaseous species are generated from solid or liquid samples by oxidation and/or reduction, pyrolysis, or other chemical processes. Such preparation devices are commercially available and allow the hyphenation of elemental analysers (EAs), or gas and liquid chromatography to IRMS. Examples of devices that provide such functionality include the EA IsoLink, LC IsoLink, GC IsoLink II, the Kiel IV Carbonate and GasBench II Device, all of which are provided by Thermo Fisher Scientific™. For brevity, this disclosure focuses on the EA-IRMS hyphenation, but it should be noted that aspects of the disclosure can be used in other settings and are certainly not exclusive to EA. For example, embodiments of this disclosure can be used together with various other peripheral devices. For instance, embodiments of the disclosure may be provided in combination with any one or more of: a sample preparation device configured to provide the sample to the separator and the bypass line; an elemental analyser-isotope ratio mass spectrometry system (EA-IRMS); an automated carbonate reaction device; an analyte source configured to provide analyte peaks (e.g. in a pulsed fashion), preferably wherein the analyte source comprises any one or more of: a trap; cryotrap; a valve; a gas chromatograph; a liquid chromatograph; a scrubber; an ion chromatography device; a capillary electrophoresis device or capillary electrochromatograph; a distillation device; a loop injector; a laser ablator; temperature conversion elemental analyser (TC/EA); and/or a headspace vial.

In many cases, a carrier gas is required to transport the sample species inside the preparation device and into an IRMS, which is referred to as continuous flow IRMS (cf IRMS). In cf IRMS, a continuous flow of an inert gas is fed into the IRMS source and carries the gaseous sample species. Carrier gas flow rates inside the sample preparation devices depend on the exact design of the devices, but are typically in a range of 1-200 mL/min. As an example, the EA IsoLink CNS performs combustion of a solid or liquid sample in a first reactor containing a catalyst such as $WO_3$. The generated species (mostly $CO_2$, $N_2$, $NO_x$, and $SO_2$) are then transported by a 50 mL/min stream of He (range 10-180 mL/min) onto a second reactor reducing $NO_x$ to $N_2$ on copper. Both reactor materials may also be present within one combined reactor. In generalised terms, the systems described herein may be continuous flow devices, and the bypass lines described herein may be configured to continuously provide the first fraction of the sample to the analyser for measurement without passing through the separator.

Figure 2:
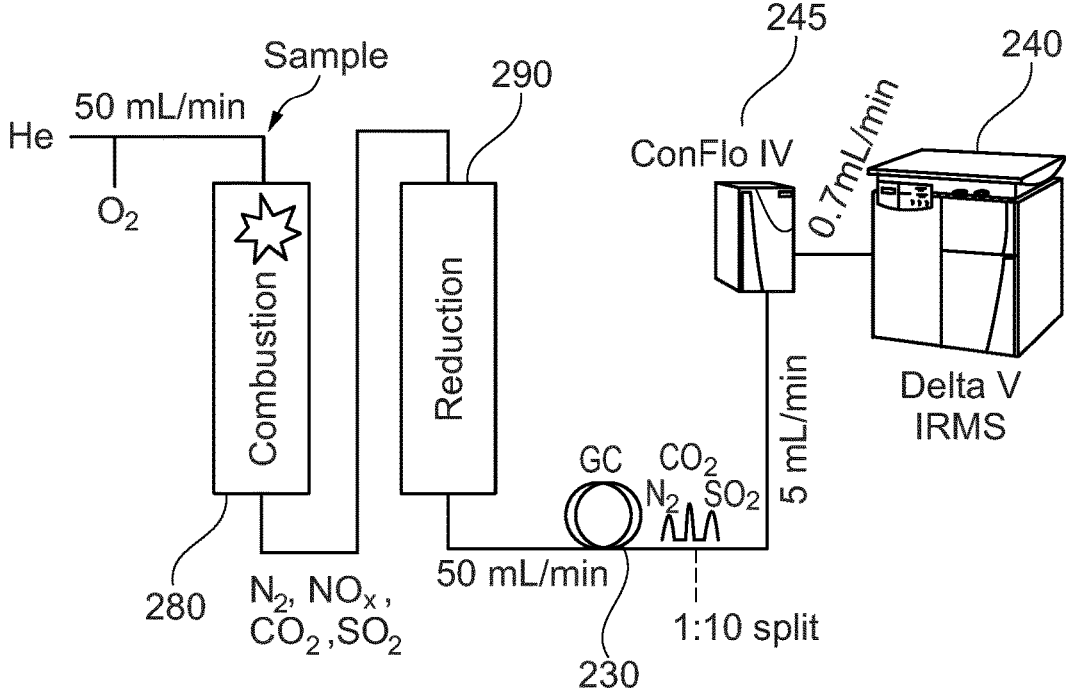
FIG. 2 shows schematically an Elemental Analyser-Isotope Ratio Mass Spectrometry (EA-IRMS) setup.

The isotope ratios of the gases $N_2$, $CO_2$ are measured using IRMS and correspond to the isotope ratios of the respective elements in the sample. FIG. 2 shows a schematic Elemental Analyser—Isotope Ratio Mass Spectrometry (EA-IRMS) setup. Samples are combusted (oxidised) in a first reactor 280 and selected species reduced in a second ($NO_x$) 290. The species are separated in time by a Gas Chromatograph (GC) 230 and provided to an IRMS 240 via a ConFlo IV Device 245. The ConFlo IV Device 245 is a continuous flow interface for the Thermo Fisher Scientific™ family of advanced IRMS detectors, which allows connection of two high-flow peripherals (e.g. EA, or a Temperature Conversion/EA) plus one low-flow peripheral (e.g. a GC-C/TC (GC-Combustion) and/or high temperature conversion, such as a GasBench II or an LC IsoLink). The ConFlo IV reduces the gas flow from these peripherals into a range that can be handled by the IRMS 240 (<1 mL/min) using techniques such as open splits. Additionally, the ConFlo IV provides isotopic reference gases and the possibility to dilute sample gas streams with Helium. Embodiments of this disclosure recognise that in contrast to the system of FIG. 2, a low flow line can be used for control and an open split design can leads to essentially zero loss in sensitivity despite the control through the low flow line.

Figure 3:
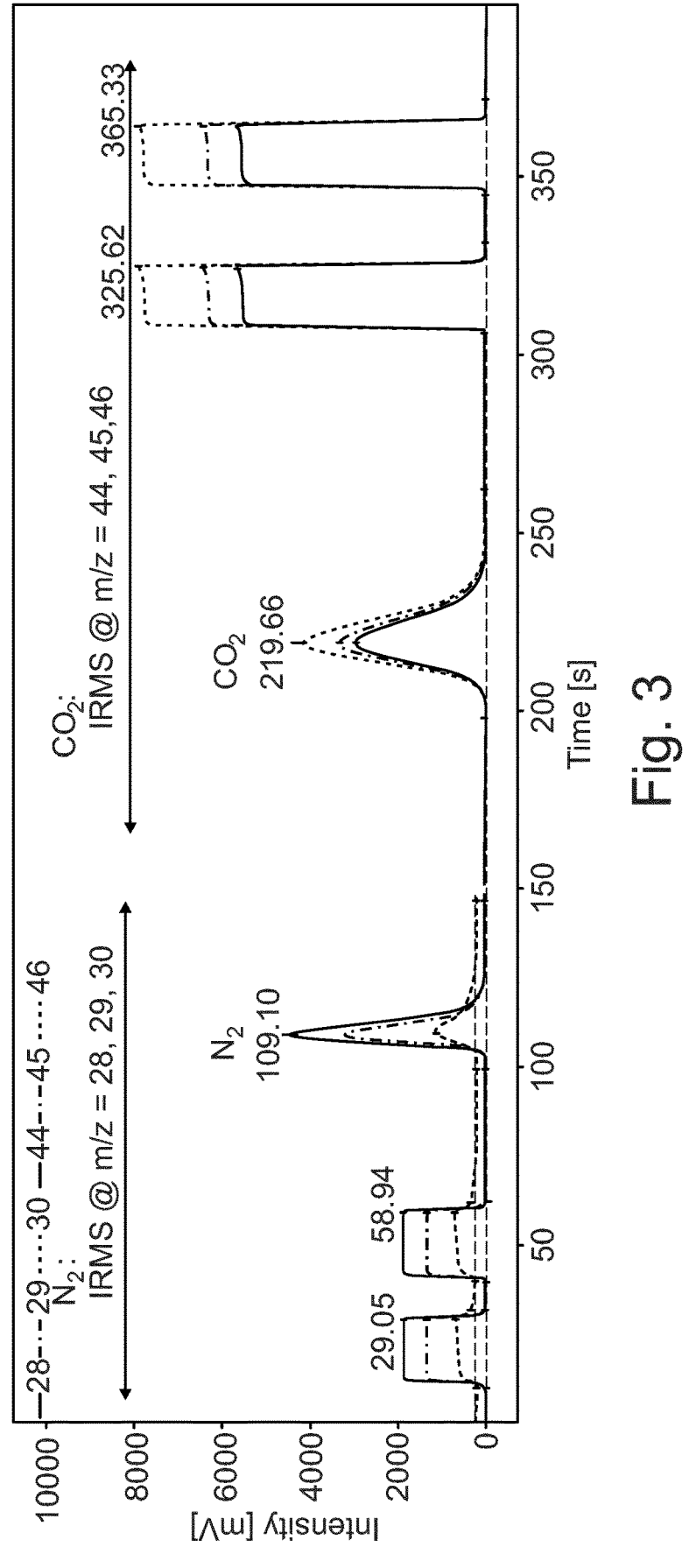
FIG. 3 shows an $N_2$, $CO_2$ chromatogram.

Sector-Field IRMS (SF-IRMS) are only capable of measuring one species at a time, so the individual sample species may be separated first. In the EA IsoLink, this is done by applying gas chromatography, separating $N_2$, $CO_2$ and $SO_2$ in time. The IRMS is set to different masses reflecting the isotopologues of the three species, while a chromatogram is obtained. FIG. 3 shows a $N_2$, $CO_2$ chromatogram of 150 μg of urea. The square pulses in FIG. 3 are IRMS reference gases.

As the IRMS source should be kept under a high vacuum, the flow rate of the carrier into the source should be in a range of <1 mL/min with Helium. In the case of the EA IsoLink, the gas flow after GC separation is still significantly higher than this flow rate. Consequently, only a small part of the carrier/sample mixture can be fed into the ion source. This can be achieved by several measures, such as: splitting away some of the gas upstream of the GC; splitting away some of the gas downstream of the GC (e.g. for the EA IsoLink, a 1:10 split is used, which is between EA Outlet and ConFlo Inlet); or feeding the gas into an open split inside the ConFlo IV and "sniffing" gas via a source capillary from the open split, rather than connecting the GC outlet directly to the ion source. All of these measures result in a reduced sensitivity of the overall setup, as sample is inevitably lost prior to IRMS analysis.

An alternative to splitting away part of the gas stream is reducing its flow rate without sacrificing sample. For the EA IsoLink, this can be achieved by reducing the carrier flow rate once the sample gas species are loaded into the GC. Another option is to avoid the gas chromatographic separation altogether, for example by trapping or cryotrapping. In the case of cryotrapping, the boiling points of the individual sample species may be used for their separation, rather than their retention times. The carrier is fed through one or more "traps", which may be glass tubes or sections of stainless steel or fused silica tubing. These traps are cooled to temperatures below the boiling points of the gases, resulting in their condensation. Depending on the respective boiling points, different ways of cooling are employed, like Peltier coolers, certain mixtures such as dry ice/acetone, but mostly liquid nitrogen. Moreover, depending on the boiling point, some gases may require the traps to be filled with an adsorptive. For example, while $N_2$ cannot be efficiently condensed using Liquid Nitrogen ($LN_2$), it can be quantitatively adsorbed on silica gel at −169° C. By using a combination of traps and/or temperatures, gas species such as $N_2$, $CO_2$ and $SO_2$ can be removed from the carrier stream and selectively re-introduced by increasing the temperature of the respective trap again.

One advantage of the trapping approach is that the carrier gas flow may be reduced during release of the sample from the trap. For example, gas species may be present in a 50 mL/min carrier flow after the reduction reactor. This carrier may be fed through a steel tube submerged in $LN_2$, resulting in the condensation of $CO_2$ (bp=−78° C.). After some time, the carrier flow is reduced to 10 mL/min and the trap is removed from the $LN_2$. The $CO_2$ evaporates and can be measured at increased sensitivity, as less of the gas stream needs to be split away upfront the IRMS. The combination of elemental analysis and cryotrapping has been described previously in the literature, including reduction of the carrier flow (see, for example, Fry et al., RCMS 10 (1996) 953-958).

Figures 6, 7, 8:
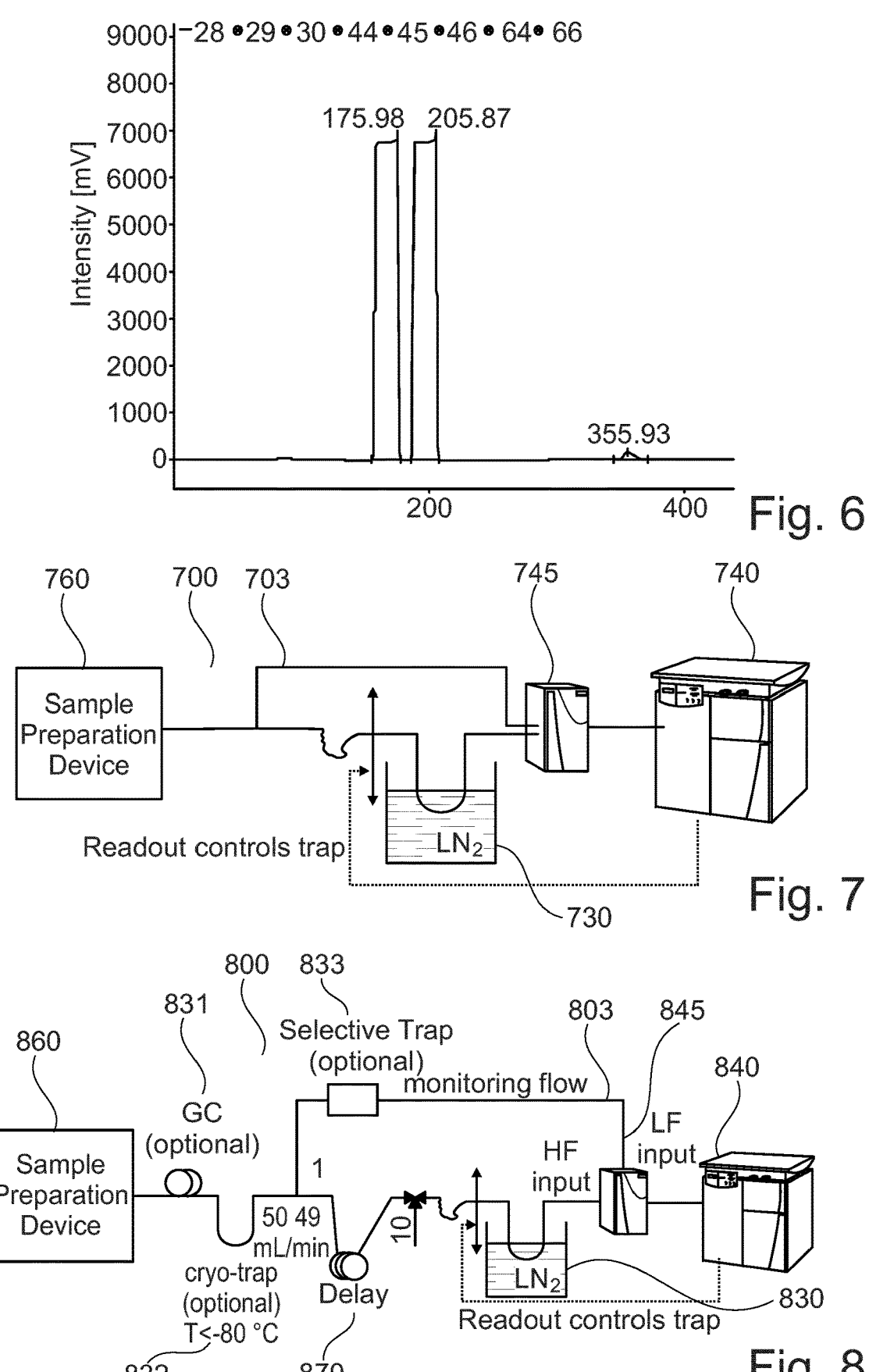
FIG. 6 shows an $N_2$ background in an IRMS signal with trapping.
FIG. 7 shows schematically a system for separating an analyte from a sample according to a second embodiment.
FIG. 8 shows schematically a system for separating an analyte from a sample according to a third embodiment.

Another option is described in WO-2021/061904. Here, the species $N_2$, $CO_2$ and $SO_2$ are separated by gas chromatography in a first step, but are then cryotrapped using liquid nitrogen for $CO_2$ and $SO_2$. $N_2$ is trapped on silica gel at −169° C. A flow of 10 mL/min is used to transport the sample species out of the traps. The setup described in the application is dedicated to the analysis of small samples ("nano-EA"), so a gain in sensitivity is required. Some embodiments of the present disclosure are also used for nano-EA applications. However, it will be understood that the disclosure may be used without using EA, such as in a simplified setup as shown in FIG. 7, which is discussed in further detail below.

Figures 4, 5:
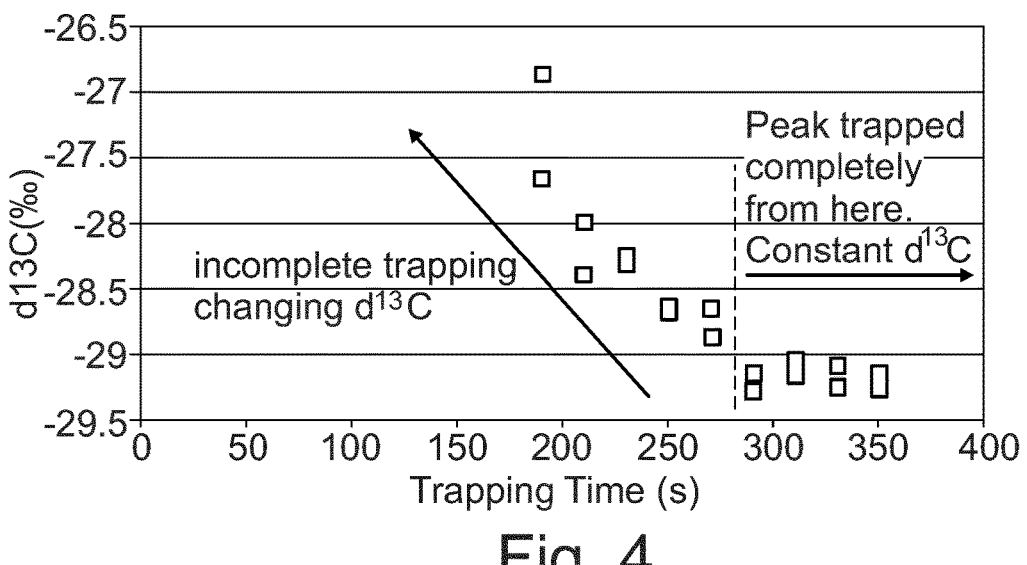
FIG. 4 shows a graph illustrating $d^{13}C$ values changing with trapping time for an EA derived $CO_2$ peak.
FIG. 5 shows an $N_2$ background in an IRMS signal without trapping.

Despite the gain in sensitivity provided by such systems and methods, cryotrapping has two important shortcomings: there is a sensitivity to the carrier background; and there is a need for quantitative trapping of sample gas species, especially for some usage scenarios (e.g. isotope ratio analysis). The two problems are interrelated. The isotope ratio of sample coming out of a GC changes during the course of a peak. Similar behaviour can be expected at the outlet of an EA or other peripherals. Therefore, it is advantageous for the full peak area to be considered for isotope ratio analysis, in order to obtain reliable and accurate results. When performing cryotrapping, reliable results are obtained if trapping starts before a sample peak arrives in the trap and only ends when all of the peak has been trapped. This is illustrated in FIG. 4. Below a certain number, the trapping time cannot be shortened further, as this impacts the isotope ratio ($d^{13}C$ values). In FIG. 4, $d^{13}C$ values change with incomplete trapping of an EA derived $CO_2$ peak. With a trapping time of more than 290 s, the peak is fully captured and $d^{13}C$ stays approximately constant.

In practice, the full peak area is traditionally considered by using very long trapping times, so that the trap collects a gas species for a time significantly longer than the base width of the peak. However, if the sample species is also present as a contaminant in the carrier (i.e. the sample is the same as the background), then it is trapped alongside the molecules from the sample. This is of particular concern in the case of $N_2$, which can enter the carrier stream of analytical instruments from the atmosphere, through various small leaks in systems. Without trapping, the $N_2$ background is of little concern, because it is visible as a constant, barely noticeable, increase of the IRMS baseline signal by a few mV, as shown in FIG. 5. The sample peak is on top of that baseline, which can easily be subtracted, if required at all. In particular, FIG. 5 shows the impact of the background in an EA with chromatographic $N_2$, $CO_2$ separation. The shown $N_2$ peaks sits on top of an instrument background of ~14 mV (m/z=28), which may be subtracted easily.

However, when trapping is used, the $N_2$ background results in a separate peak (which is described as a blank), which lies exactly underneath the sample peak. Simple subtraction is not straightforward in this case. In FIG. 6, the impact of the blank is shown. In FIG. 6, the data are from a nano-EA setup with trapping, with no sample introduced (m/z=28 is shown here). The visible peak is solely due to traces of $N_2$ present in the carrier.

Subtraction of the blank peak from a sample peak is not straightforward and can complicate measurement and/or reduce measurement accuracy.

The contribution of the blank is proportional to the background (i.e. on the amount of contaminant present in the carrier) and to the trapping time and can be calculated as:

$$\text{Blank}(Vs)=\text{Background}(V)\times\text{Trapping Time}(s)$$

If the background cannot be reduced further, it is desirable to use a trapping time as short as possible (to reduce the blank contribution), but long enough to avoid incomplete trapping of the sample species (which would result in fractionation, as illustrated in FIG. 4 and discussed above).

The situation is further complicated by the fact that peak width depends on the amount of sample. A large sample would therefore result in a broad peak, requiring a long trapping time. However, this long trapping time would be detrimental to the blank, which would be more significant if a small sample is measured (because the blanks' relative contribution to the peak becomes more significant). As a consequence, embodiments of the present disclosure address these problems, because they can allow trapping to be started at the correct time (only before the peak arrives at the trap) and can stop trapping once the peak is completely trapped (but without trapping for longer than is necessary).

In FIG. 7, there is shown a system 700 for separating analyte from a sample, according to a second embodiment. The system 700 is similar to the system 100 of FIG. 1 in some respects and a discussion of similar features is omitted for brevity. The system 700 comprises a sample preparation device 760, which provides a first fraction of the sample to a bypass line 703 (which is similar to the third conduit 103 of FIG. 1) and a second fraction of the sample to the separator 730, which in this embodiment is a cryotrap (although other types of separator can be used).

The system 700 also comprises an analyser 740, which is downstream of the separator 730. The analyser 740 determines when the peak of a sample species is present in the first fraction of sample received via the bypass line 703. The sample is fed to the analyser 740 by an interface 745 (e.g. a ConFlo IV Device), which may have two ports for providing the analyser 740 with the first fraction of the sample received via the bypass line 703 and the second fraction of the sample receive via the separator 730.

The readout of the analyser 740 is used (by a controller, which is not shown for simplicity) to operate the cryotrap 730 using the following control method:

(i) When the analyser 740 detects the analyte in the carrier→start trapping;

(ii) When the analyser 740 no longer detects the analyte in the carrier→end trapping.

In this way, precise control over the timing of activation and deactivation of the cryotrap 730 can be achieved. Step (i) may be considered, in a general sense, as the controller being configured to activate the separator based on the received measurement indicating that the first fraction of the sample comprises greater than or equal to a lower threshold quantity of the analyte. Step (ii) may be considered as the controller being configured to deactivate the separator based on the received measurement indicating that the first fraction of the sample comprises less than or equal to an upper threshold quantity of the analyte. The thresholds for activation and deactivation may be the same or different. Activation of the separator may be effected when the analyte signal is at least 2, 3, 4 or 5 standard deviations above the blank signal or background signal. A preferred threshold value is 3 standard deviations, which provides an acceptable balance between statistical certainty that the peak has commenced, and quick detection of the analyte. The same thresholds may be used when deactivating the separator.

In a variant of this control method, the analyser 740 may sense the amount of the sample (e.g. using the detector signal height) and use this reading to calculate an expected width or duration of the peak. This approach uses the proportionality (or another relation) of signal height to peak width and may be advantageous if the sensitivity of the detector is too low to reliably detect the end of the peak. This may be advantageous if the sample peak has a pronounced tail, where a "peak end" is hard to find, especially when the peak height is determined from the relatively small monitoring flow received via the bypass line 703.

In general terms, in this variation, the controller may be configured to: determine a time period based on the received measurement; and deactivate the separator after the determined time period. The time period may be based on: an intensity (e.g. the peak height) of the received measurement; and/or a calibration peak having a known relationship between measurement intensity and peak width. Thus, the deactivation time of the trap can be controlled advantageously even where it is difficult to detect where a peak ends. Such known relationships between measurement intensity and peak width may be determined using calibration samples and the results of such calibrations may be stored by the controller. In general terms, the controller may be configured to: identify, based on the received measurement, a peak (e.g. a local maximum in measured signal intensity) having a peak height. Then, the controller may be configured to determine, based on the peak height, a value for the time period that corresponds with a predicted peak width of the peak. For example, the time period may be set to be equal to, or approximately equal to (e.g. differing by no more than a certain amount from), the likely temporal duration of a peak having the identified peak height. In this way, a relationship between a typical peak shape (i.e. the typical relationship between signal intensity and time) can be used to determine when to deactivate the separator.

It is advantageous for the analyser 740 to be highly sensitive, e.g. having a Limit of Detection as less than 1 ppb For example, in some cases it may be desirable to be possible to see a 10 mV $N_2$ signal on a $3\times10^8$ Ohm amplifier, which is equivalent to $3\times10^{-11}$ A of current or $2\times10^8$ $N_2$ molecules per second. From the monitoring flow, 2/3 are still not entering the MS source, so approximately $6\times10^8$ molecules or $2.7\times10^{-17}$ kg are required. This amount is present in 3.3 mL He (or $6\times10^{-7}$ kg) for a flow rate of 200 mL/min, so a sensitivity of $<1\times10^{-10}$ may be advantageous, although it will be appreciated that lower (or higher) sensitivity might be required when considering other analytes and flow rates. High sensitivity is advantageous, because trapping is useful for small samples where very little analyte is expected to be present (e.g. EA for materials containing few hundred ng per sample). One example of an analyser 740 that may be used in embodiments of the disclosure is an electron capture detector (ECD) with high sensitivity, at least for $N_2$. However, ECD are expensive and (often) work with a radioactive source, limiting their applicability. In some embodiments, it may be useful to use a non-destructive detector as the analyser 740, so that sample can be used after having been analysed. However, the monitoring flow provided by the bypass line 703 may be transported to a highly sensitive but destructive detector, such as a mass spectrometer.

The monitoring flow in the systems described herein is typically much smaller than the carrier flow going to the separator or trap (e.g. 1 mL/min to the detector, and 50 mL/min to the trap). Hence, in the systems described herein, the first fraction of the sample (used for the monitoring flow via the bypass line) may comprise a first percentage (typically percentage by volume, although the percentage could be by weight) of the sample, the first percentage being: less than or equal to 1%; less than or equal to 2%; less than or equal to 5%; or less than or equal to 10%. Accordingly, the second fraction of the sample may comprise a second percentage (again typically percentage by volume, but the percentage could be by weight) of the sample, the second percentage being: greater than or equal to 90%; greater than or equal to 95%; greater than or equal to 98%; or greater than or equal to 99%. Hence, a majority of the sample may be provided to the analyser without passing through the bypass line. Accordingly, accurate measurements can be taken without wasting a large amount of sample on the generation of control signals.

In the system 700 of FIG. 7, the separator 730 is a trap, which in this case comprises tubing submerged in Liquid Nitrogen ($LN_2$). If the analyser 740 identifies the presence of an analyte in the monitoring flow, the tube is lowered into the $LN_2$ to activate the separator 730 immediately, ensuring that only a small proportion of the analyte passes through the separator 730 while it is not activated. The sample species is trapped by the activation of the cryotrap 730. The activation of the cryotrap 730 causes the cryotrap 730 to separate the second fraction of the sample (i.e. the fraction received without passing through the bypass line 703) into a first portion, which is trapped, and a second portion, which is not trapped. This continues for as long as the analyser 740 detects the presence of the analyte. Once the analyser 740 detects from the monitoring flow, received via the bypass line 703, that no more than a certain amount of analyte is present, the tube can be raised from the $LN_2$ so that the first portion comprising trapped analyte is released to the analyser 740 for measurement. Thus, the bypass line 703 serves to provide improved control over the timing of activation of the separator 730, with the monitoring flow received via the bypass line 703 being used to determine when the separator 730 should be activated and deactivated. In this way, very little analyte is lost (due to the precise timing of activation) while reducing the risk of contamination of the sample (e.g. due to having the separator operating for longer than is necessary).

It will be understood many variations may be made to the system 700 of FIG. 7. The sample preparation device can be an Elemental Analyzer (with or without subsequent GC) but can also another device, such as a GasBench II. Moreover, the analyser 740 may be equipped with a set of amplifiers if this is required to detect the sample peak in the monitoring flow. Furthermore, while the separator 730 is shown as being a cryotrap, other separators can be used. Additionally, the analyser 740 is described as being an IRMS, but various other types of analyser can be used. The interface 745 for the analyser 740 may be omitted entirely, if the analyser 740 itself comprises appropriate ports for receiving sample from the various components of the system 700 (such as the separator 730 and the bypass line 703).

In FIG. 8, there is shown a system 800 for separating an analyte from a sample according to a third embodiment. The system 800 comprises a sample preparation device 860, a bypass line 803, a separator 830 (which in this embodiment is a trap), an analyser 840 and an interface 845 for the analyser 840. These operate similarly to the previously-described components of the first and second embodiments. As before, the bypass line 803 is used to monitor the amount of analyte within the sample. This serves to provide improved control over the timing of activation of the separator 830, with the monitoring flow received via the bypass line 803 being used to determine when the separator 830 should be activated and deactivated. In this way, very little analyte is lost (due to the precise timing of activation) while reducing the risk of contamination of the sample (e.g. due to having the separator operating for longer than is necessary).

A motivation for the system 800 of FIG. 8 is that in some cases, a detector may not provide adequate selectivity towards the species to be trapped. As an example, $CO_2$ and $N_2$ may be generated in an EA that is intended for trapping $N_2$. The abundance sensitivity of a sector field MS may not allow full discrimination of the $N_2$ against $CO_2$, and one common peak for both species may be detected. In such cases, further separation of the respective species can be implemented. This can be achieved by placing a GC 831, a cryotrap 832, and/or a selective trap 833 (which constitutes a further separator) upstream of the detector 840, so as to remove (or at least reduce the influence of) the interfering species. Thus, the system 800 of FIG. 8 comprises more than one separator. In generalised terms, the systems described herein may comprise one or more further separators. At least one further separator may be upstream of the bypass line. Preferably, at least two further separators (e.g. a GC and a cryotrap, although various other combinations can be used depending on the particular analye) are upstream of the bypass line. Moreover, in some cases the bypass line may comprise at least one further separator, which may be a trap or a selective trap (e.g. a chemical trap). Where a plurality of separators are used, the controllers described herein may be configured to control activation of one, a plurality, or all of the separators based on measurements received from the analyser.

Multiport valves within the system 800 may be used to divert gas streams to the correct traps and to feed carrier through the various traps. By providing a GC 831 and/or a cryotrap 832 upstream of the monitoring flow split point, $CO_2$ can be prevented from entering the monitoring flow while monitoring is performed for $N_2$ only. Thus, the control signals provided based on the monitoring flow may be significantly improved.

The system 800 may be configured so that the sample arrives in the trap 830 after it is sensed in the monitoring flow. If the sample arrives in the trap 830 before being sensed in the monitoring flow, then the trap 830 may be lowered too late. Thus, as a mitigation, a delay line 870, such as a long capillary (e.g. having a length of several meters), may be installed between the split point (at which the bypass line 803 originates) and the separator 830. The capillary serves as a delay and may be used in a similar fashion as described in U.S. Pat. No. 8,402,814B2, in relation to smart EA. The entire contents of U.S. Pat. No. 8,402,814B2, and in particular the long capillaries described, are incorporated herein by reference.

Returning to the generalised terms used previously, the systems described herein may comprise a delay line configured to delay the second fraction of the sample relative to the first fraction of the sample. Such a delay line may comprise a capillary tube (e.g. a silica tube) dimensioned (i.e. long enough to provide an appreciable delay) to delay the second fraction of the sample relative to the first fraction of the sample. The precise dimensions of the delay line will depend on the overall flow rate within the system, the relative amounts of sample flowing through the bypass line and to the separator. It will be appreciated that the precise configuration of the delay line can be modified to provide a desired degree of delay. The delay line may provide a fixed delay or an adjustable delay. Alternatively, the systems described herein may be configured such that the first fraction of the sample arrives at the analyser before the second fraction of the sample arrives at the separator without the use of a delay line.

This system 800 uses an IRMS 840 to detect the presence of an analyte before trapping occurs. This has at least two main advantages. Firstly, the IRMS 840 is already provided for the purpose of performing isotope ratio measurement. Moreover, the IRMS 840 has a very high sensitivity, not only for $N_2$. That said, a mass spectrometer is a destructive detector, so some sample is lost, but this is acceptable in many contexts. Due to the extremely high sensitivity of the analyser 840, control signals for the separator 830 can be generated reliably using only a very small fraction of the carrier gas stream (i.e. the first fraction received via the bypass line 803), which is split away for MS analysis and results in only a small loss of sample. Such a bypass line 803 may feed ~1 mL/min (monitoring flow), from a total stream of 50 mL/min, into the IRMS 840 via the interface 845 (which is a ConFlo IV Device in FIG. 8). The interface 845 has two inputs for gas flows of about 10 mL/min (High Flow) and a separate one for Low Flows (1 mL/min). Switching between the individual inputs can be performed within a few seconds. The trap 830 output is connected to one of the High Flow inputs of the interface 845, while the monitoring flow is fed into the Low Flow input.

Figure 9:
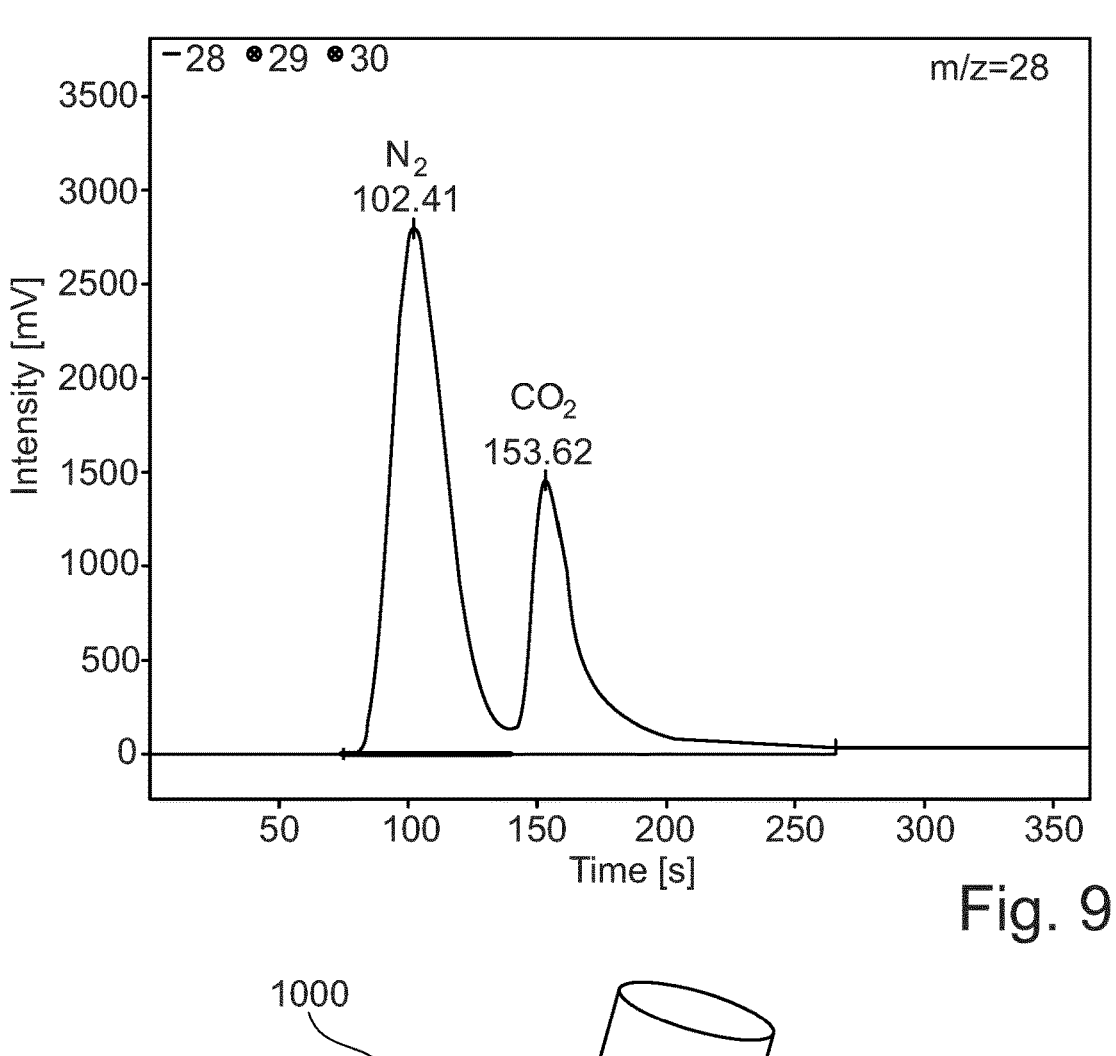
FIG. 9 shows a graph illustrating the selectivity of a sector field IRMS by considering EA analysis with Gas Chromatography (GC) separation.

As the abundance sensitivity of the single focusing SF-IRMS may not allow reliable discrimination between various species, such as $N_2$ and $CO_2$, as illustrated in FIG. 9, a GC column 831 and/or a cryotrap 832 may be placed downstream of the preparation device 860. In particular, in FIG. 9, the reduced selectivity of SF-IRMS can be seen by considering EA analysis with GC separation on a sample of 188 µg caffeine. Despite being operated on m/z=28 (i.e. targeted for $N_2$), the $CO_2$ peak is visible as well, even though $CO_2$ has m/z=44. This occurs because $CO_2$ dissociates, leading to the formation of CO, $O_2$ and C through various interactions, and CO happens to have m/z=28, which is the same as $N_2$. Thus, the disclosure is particularly advantageous in scenarios in which $CO_2$ and $N_2$ are likely to interfere. Nevertheless, it will be appreciated that a vast number of interfering species exist, so the invention is not limited to the use of $N_2$ or $CO_2$.

Additionally or alternatively, a trap 833 (which can be considered a further separator, in addition to the trap 830 which also acts as a separator) may also be placed in the monitoring flow of the bypass line 803. In that case, $CO_2$ may be removed by a selective, chemical trap (which may be non-reversible, e.g. Ascarite (RTM), which is sodium hydroxide coated silica that can be used as a carbon dioxide adsorbent). Hence, the accuracy of control signals provided based on the monitoring flow is increased due to elimination or reduction of contaminant in the monitoring flow. In the generalised terms used previously, the separator may comprise a selective trap or a chemical trap. The bypass line may comprise such a separator. In particular, the bypass lines of the present disclosure may comprise a further separator, which may be a trap, such as a cryotrap, selective trap or chemical trap.

In use, the system 800 of FIG. 8 operates as follows. At the beginning of a measurement, the IRMS 840 is set on the masses of the respective analyte (e.g. $N_2$: m/z=28, 29, 30, to account for isotopic variants) and the Low Flow (LF) port of the interface 845 is opened. As soon as the IRMS 840 detects a significant signal increase, the trap 830 is activated, by lowering it into $LN_2$ and the analyte is therefore collected. At the same time, any gas coming into the High Flow (HF) port of the interface 845 is vented so as to discard the portion of the sample that passes through the trap 830 while the trap 830 is activated. Thus, in general terms, the systems described herein may further comprise an outlet (e.g. a vent), the controller configured to cause the outlet to discard (e.g. vent away) or transport away (e.g. to another separator or another analyser) a portion of the second fraction of the sample that passes through the separator while the separator is activated.

When no more analyte is detected with the IRMS 840, the interface 845 port is changed to the HF port, the trap 830 is lifted to deactivate trapping, and the evaporated analyte is thus released from the trap 830 and carried to the interface 845 with a (reduced, ~10 mL/min) stream of inert gas.

Thus, returning to the generalised terms used previously, in systems in which the separator comprises a trap, the controller may be configured to deactivate the trap to release the second fraction of the sample to the analyser, based on the received measurement indicating that the first fraction of the sample comprises less than or equal to an upper threshold quantity of the analyte. Hence, a majority of the sample may be released for measurement only when it has been adequately trapped and separated. Where an interface comprising a first port and a second port is used, the first port may be configured to receive the first fraction of the sample and to provide the first fraction of the sample to the analyser; and the second port is configured to receive the second fraction of the sample and to provide the second fraction of the sample to the analyser. The controller may be configured to deactivate the first port and to activate the second port when (e.g. only if) the received measurement indicates that the first fraction of the sample comprises less than or equal to an upper threshold quantity of the analyte. The first port may be a low flow port and the second port may be a high flow port. For example, the low flow port may be incapable of or unsuitable for receiving flow rates as high as the high flow port. Stated differently, the first port may be capable of handling a relatively low flow and the second port may be capable of handling a relatively high flow.

It will be appreciated many variations may be made to the embodiment of FIG. 8. For example, optionally, the analyser 840 may be equipped with a set of amplifiers if this is required to detect the sample peak in the monitoring flow. Hence, in general terms, the systems described herein may comprise one or more amplifiers configured to amplify the measurement obtained by the analyser on: the first fraction of the sample; and/or the second fraction of the sample. Moreover, while the separator 830 is shown as being a cryotrap, other separators can be used. The separator could be a valve (such as a 3-way, 4-way, 5-way or 6-way valve). In some cases, the separator 830 could comprise a loop together with a valve. For example, an analyte peak arriving at such a valve could be loaded into the loop and flushed out to the analyser 840 at a lower flow rate. Additionally or alternatively, the separator 830 could comprise a GC. Once the analyte is in a GC column, the carrier flow rate is reduced, so the concentration of the analyte in the carrier increases. Increasing the GC temperature at the same time could be used to counteract peak broadening. GB2537915B describes systems for concentrating analyte gas in a gas stream of an analytical system and it will be understood that the systems described therein can be used in the present disclosure.

Additionally, the analyser 840 is described as being an IRMS, but various other types of analyser can be used. The interface 845 for the analyser 840 can be omitted in some cases, if the analyser 840 is capable of receiving sample from the various components of the system 800.

Figure 10:
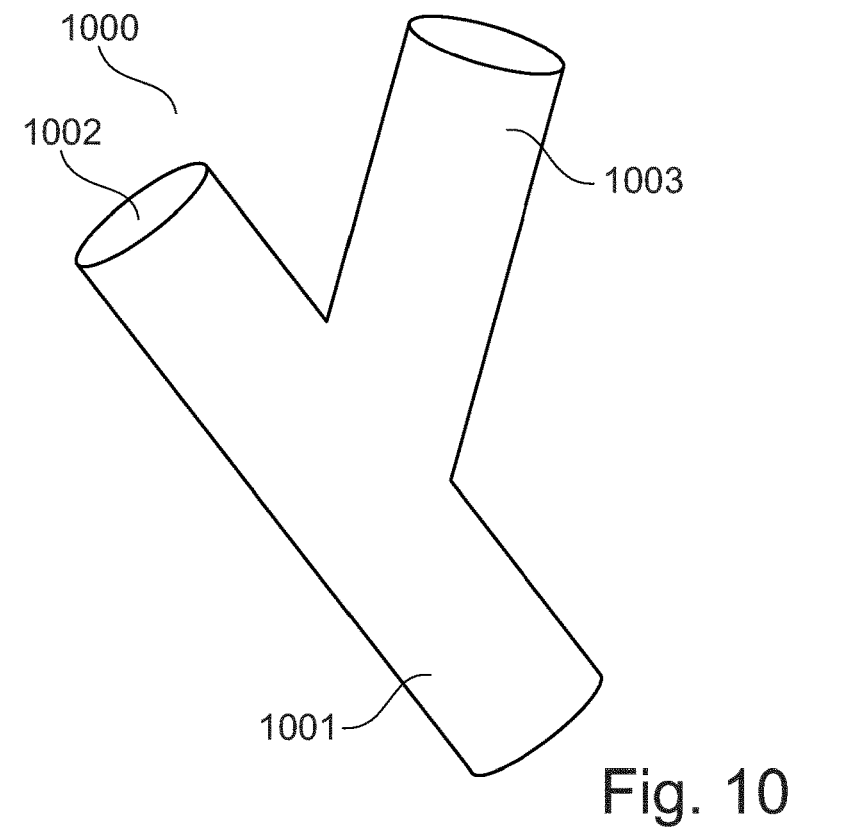
FIG. 10 shows schematically a splitter for use in any of the embodiments described herein.

Turning next to FIG. 10, there is shown a splitter 1000 that is suitable for use in the systems 100, 700, 800 and 1100 of the first, second, third and fourth embodiments. In each case, a bypass line transports a fraction of the sample to an analyser without passing through a detector. To achieve this, a splitter 1000 in the carrier flow may be used. Such a splitter 1000 may also be used to vent off waste product from the separators of the previous embodiments.

The splitter may be formed as part of the conduit system described in relation to the first embodiment. The splitter could be integrally formed with the conduits described previously, or it could be configured for attachment to the conduits described previously. In FIG. 10, the splitter comprises a first conduit 1001 that receives sample (e.g. from a sample preparation device) and provides a first fraction of the sample to a second conduit 1002 and a second fraction of the sample to a third conduit 1003. The splitter 1000 thus acts as a fork in the sample flow that divides the sample into fractions. It will be appreciated that the splitter 1000 may comprise valves and may be controllable and adjustable to allow adjustment of the relative flow rates in the second and third conduits 1002 and 1003. Moreover, the splitter 1000 is shown as having three conduits of substantially equal diameter, but the conduits could have different diameters to provide different flow rates through each respective conduit.

Turning next to FIG. 11, there is shown a system 1100 for separating one or more analytes from a sample according to a fourth embodiment. This system 1100 may be described as comprising a cascading arrangement of separators. The system 1100 comprises a plurality of conduits 1101, 1102, 1103a, 1103b, 1104a, 1104b, 1105a and 1105b. The sample passes through these conduits as the sample is separated by the system 1100.

A sample is fed to the system via a first conduit 1101, and the sample is split and transported to a second conduit 1102 and a primary third conduit 1103a. The second conduit 1102 transports a fraction of the sample to the primary separator 1130a, while the primary third conduit 1103a (which acts as a bypass line) transports a fraction of the sample directly to the analyser 1140 without passing through the primary separator 1130a. The primary separator 1130a acts to separate analyte from the sample in the same way as the separator 130 of the first embodiment. Similarly, the analyser 1140 takes measurements on the sample in the same way as the analyser 140 of the first embodiment. The system further comprises a controller 1150, which is capable of controlling the primary separator 1130a and receiving measurements from the analyser 1140. This is similar to the way in which the controller 150 of the first embodiment is configured. In this way, the analyser 1140 can control activation of the primary separator 1130a based on measurements taken on the fraction of the sample received via the primary bypass line 1103a. This ensures that the timing of activation/deactivation (and changing the degree of activation) of the primary separator 1130a can be controlled with precision.

A portion of the sample emerging from the primary separator 1130a is transported by a primary fourth conduit 1104a to the analyser 1140, in the same way as the first embodiment. However, in this embodiment, a primary fifth conduit 1105a is provided, to make use of the other portion of the sample emerging from the primary separator 1130a. This other portion of the sample may be the portion of the sample that was not targeted by the primary separator 1130a. A fraction of the sample passing through the primary fifth conduit 1105a is transported straight to the analyser 1140 via the secondary third conduit (or secondary bypass line) 1103b without passing through the secondary separator 1130b. Another fraction of the sample passing through the primary fifth conduit 1105a is transported directly to the secondary separator 1130b for separation, with the output of the secondary separator 1130b being connected to the analyser 1140 via a secondary fourth conduit 1104b. A secondary fifth conduit 1105b can be used to transport another portion of the sample emerging from the secondary separator 1130b to elsewhere. For example, the secondary fifth conduit 1105b may be used to discard of certain species that are not of interest. Alternatively, the secondary fifth conduit 1105b may be connected to further separators configured in the same way as the secondary separator 1130b.

In the fourth embodiment, measurements made by the analyser 1140 can be used by the controller 1150 to control activation of the secondary separator 1130b, based on measurements made on the fraction of the sample provided by the secondary bypass line 1103b. Accordingly, the secondary separator 1130b is used in a similar way to the primary separator 1130a. Thus, the fourth embodiment is similar to the first embodiment, with the main difference being that fifth conduit 105 of the first embodiment is connected to a secondary separator 1130b and a secondary bypass line 1103b. The secondary separator 1130b and secondary bypass line 1103b can be used to separate an additional analyte (or additional analytes) from the sample. For example, the primary separator 1130a may be configured for separating a first analyte from the sample and the secondary separator 1130b may be configured for separating a second analyte (which may be different from the first analyte) from the sample. Accordingly, the system 1100 may be capable of separating a plurality of different species with a high degree of control.

The system 1100 of FIG. 11 can be modified in various ways. For instance, the analyser 1140 may comprise one analyser having multiple ports to allow simultaneous receipt of multiple fractions and portions of a sample. Alternatively, the analyser 1140 may comprise a plurality of analysers (e.g. one analyser for each separator, with switching ports/valves to allow multiple to be analysed). One or more analyser interfaces (e.g. similar to the interfaces 745 and 845 of FIGS. 7 and 8) may also be provided, for controlling the way in which the samples are provided to the analyser 1140. Additionally, further separators (e.g. similar to the further separator 833 in FIG. 8) may be provided in one or both of the bypass lines 1103a and 1103b. Similarly, one or more further separators may be provided upstream of the separators 1130a and 1130b (e.g. in the first conduit 1101), similarly to how the separators 831 and 832 in FIG. 8 are upstream of the separator 830.

Thus, returning to the generalised terms used previously, the separators described herein may be a primary separator (e.g. 1130a). The systems described herein may comprise a further separator (e.g. separator 1130b), which may alternatively be described as a secondary separator, that is downstream of the primary separator. For instance, the further separator that is downstream of the primary separator may be configured to receive a portion of sample output from the primary separator. Preferably, the system may comprise a further bypass line (e.g. 1103b) configured to provide a further fraction of the sample to the analyser (e.g. 1140) for measurement, without passing through the further separator that is downstream of the primary separator. In this way, multiple analytes may be separated from a sample effectively.

The separators and further separators described herein may comprise any one or more of: a gas chromatograph; and a liquid chromatograph; a cryotrap; a chemical trap; a selective trap; a scrubber; a trap; a cryotrap; a valve; a gas chromatograph; a liquid chromatograph; an ion chromatography device; a capillary electrophoresis device or capillary electrochromatograph; and/or a distillation device. Moreover, the analysers described herein may comprise any one or more of: a concentration-dependent detector; a mass spectrometer; an isotope ratio mass spectrometer (IRMS); an electron capture detector; a thermal conductivity detector; a flame ionisation detector; and/or an ultraviolet-visible spectroscopy device.

It will be understood that many variations may be made to the above apparatus, systems and methods whilst retaining the advantages noted previously. For example, where specific components have been described, alternative components can be provided that provide the same or similar functionality.

ConFlo IV Devices have been described extensively and illustrated, but any interface for an analyser can be used. For example, an analyser with an integrated interface could be provided.

Moreover, the above embodiments mostly describe separation of gaseous samples, but other forms of matter can be separated using the systems described herein. $N_2$ and $CO_2$ are predominantly described, but various other analytes can be considered.

A method of manufacturing and/or operating any of the systems disclosed herein is also provided. The method may comprise steps of providing each of the features disclosed and/or configuring or using the respective feature for its stated function. For instance, there is provided a method for separating an analyte from a sample, comprising: providing a first fraction of the sample to an analyser for measurement without passing through a separator, the analyser being downstream of the separator; receiving a measurement obtained by the analyser on the first fraction of the sample, the measurement indicating that the first fraction of the sample comprises a threshold quantity of the analyte; and controlling activation of the separator based on the received measurement. Such a method may comprise performing any of the additional steps described herein.

Each feature disclosed in this specification, unless stated otherwise, may be replaced by alternative features serving the same, equivalent or similar purpose. Thus, unless stated otherwise, each feature disclosed is one example only of a generic series of equivalent or similar features.

As used herein, including in the claims, unless the context indicates otherwise, singular forms of the terms herein are to be construed as including the plural form and, where the context allows, vice versa. For instance, unless the context indicates otherwise, a singular reference herein including in the claims, such as "a" or "an" (such as a separator or an analyser) means "one or more" (for instance, one or more separators, or one or more analysers). Throughout the description and claims of this disclosure, the words "comprise", "including", "having" and "contain" and variations of the words, for example "comprising" and "comprises" or similar, mean that the described feature includes the additional features that follow, and are not intended to (and do not) exclude the presence of other components.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

Any steps described in this specification may be performed in any order or simultaneously unless stated or the context requires otherwise. Moreover, where a step is described as being performed after a step, this does not preclude intervening steps being performed.

All of the aspects and/or features disclosed in this specification may be combined in any combination, except combinations where at least some of such features and/or steps are mutually exclusive. In particular, the preferred features of the disclosure are applicable to all aspects and embodiments of the disclosure and may be used in any combination. Likewise, features described in non-essential combinations may be used separately (not in combination).

CLAUSES

1. A system for separating an analyte from a sample, comprising:
   a separator configured to separate the analyte from the sample;
   an analyser configured to obtain measurements indicative of a quantity of the analyte in the sample, wherein the analyser is downstream of the separator;
   a bypass line configured to provide a first fraction of the sample to the analyser for measurement without passing through the separator; and
   a controller configured to:
      receive a measurement obtained by the analyser on the first fraction of the sample received via the bypass line, the measurement indicating that the first fraction of the sample received via the bypass line comprises a threshold quantity of the analyte; and
      control activation of the separator based on the received measurement.

2. The system of clause 1, wherein the controller is configured to activate the separator based on the received measurement indicating that the first fraction of the sample comprises greater than or equal to a lower threshold quantity of the analyte.

3. The system of clause 2, wherein the controller is configured to:
   determine a time period based on the received measurement; and
   deactivate the separator after the determined time period.

4. The system of clause 3, wherein the controller is configured to determine the time period based on: an intensity of the received measurement; and/or a calibration peak having a known relationship between measurement intensity and peak width.

5. The system of any preceding clause, wherein the controller is configured to deactivate the separator based on the received measurement indicating that the first fraction of the sample comprises less than or equal to an upper threshold quantity of the analyte.

6. The system of any preceding clause, wherein the controller is configured to:
   receive a plurality of measurements obtained by the analyser on the first fraction of the sample at different times; and
   control activation of the separator based on each of the received measurements;
   preferably wherein:
      the controller is configured to activate the separator based on a first received measurement indicating that the first fraction of the sample comprises at least a lower threshold quantity of the analyte; and
      the controller is configured to deactivate the separator based on a second received measurement, received after the first received measurement, indicating that the first fraction of the sample comprises less than or equal to an upper threshold quantity of the analyte.

7. The system of any preceding clause, wherein the bypass line is configured to continuously provide the first fraction of the sample to the analyser for measurement without passing through the separator.

8. The system of any preceding clause, wherein the first fraction of the sample comprises a first percentage of the sample, wherein the first percentage is: less than or equal to 1%; less than or equal to 2%; less than or equal to 5%; or less than or equal to 10%.

9. The system of any preceding clause, configured to provide a second fraction of the sample to the analyser without passing through the bypass line, preferably wherein the system is configured such that the second fraction of the sample passes through the separator.

10. The system of clause 9, configured such that the first fraction of the sample arrives at the analyser before the second fraction of the sample arrives at the separator.

11. The system of clause 9 or clause 10, further comprising a splitter upstream of the separator, the analyser and the bypass line, wherein the splitter is configured to split the sample into the first and section fractions of the sample.

12. The system of any of clauses 9 to 11, further comprising an outlet, wherein the controller is configured to cause the outlet to discard or transport away a portion of the second fraction of the sample that passes through the separator while the separator is activated.

13. The system of any of clauses 9 to 12, further comprising a delay line configured to delay the second fraction of the sample relative to the first fraction of the sample.

14. The system of clause 13, wherein the delay line comprises a capillary tube dimensioned to delay the second fraction of the sample relative to the first fraction of the sample.

15. The system of any of clauses 9 to 14, wherein:

the separator comprises a trap; and the controller is configured to deactivate the trap to release at least a portion of the second fraction of the sample to the analyser, based on the received measurement indicating that the first fraction of the sample comprises less than or equal to an upper threshold quantity of the analyte.

16. The system of any of clauses 9 to 15, wherein the second fraction of the sample comprises a second percentage of the sample, wherein the second percentage is: greater than or equal to 90%; greater than or equal to 95%; greater than or equal to 98%; or greater than or equal to 99%.

17. The system of any preceding clause, configured such that a majority of the sample is provided to the analyser without passing through the bypass line.

18. The system of any preceding clause, comprising one or more further separators.

19. The system of clause 18, wherein at least one further separator is upstream of the bypass line, preferably wherein at least two further separators are upstream of the bypass line.

20. The system of clause 18 or clause 19, wherein the bypass line comprises at least one further separator, preferably wherein the bypass line comprises a trap or a selective trap.

21. The system of any of clauses 18 to 20, wherein at least one further separator is downstream of the separator, preferably wherein the system comprises a further bypass line configured to provide a further fraction of the sample to the analyser for measurement without passing through the further separator.

22. The system of any of clauses 18 to 21, wherein the one or more further separators comprise any one or more of: a gas chromatograph; a liquid chromatograph; a cryotrap; a chemical trap; a selective trap; a scrubber; a trap; a cryotrap; a valve; a gas chromatograph; a liquid chromatograph; an ion chromatography device; a capillary electrophoresis device or capillary electrochromatograph; and/or a distillation device.

23. The system of any preceding clause, wherein the system comprises a plurality of separators and the controller is configured to control activation of one, a plurality, or all of the separators based on measurements received from the analyser.

24. The system of any preceding clause, further comprising an interface for the analyser, the interface comprising a first port and a second port, wherein:

the first port is configured to receive the first fraction of the sample and to provide the first fraction of the sample to the analyser; and the second port is configured to receive the second fraction of the sample and to provide the second fraction of the sample to the analyser; preferably wherein:

the first port is a relatively low flow port and the second port is a relatively high flow port.

25. The system of clause 24, wherein the controller is configured to deactivate the first port and to activate the second port when the received measurement indicates that the first fraction of the sample comprises less than or equal to an upper threshold quantity of the analyte.

26. The system of any preceding clause, wherein the separator comprises any one or more of: a gas chromatograph; a liquid chromatograph; a cryotrap; a chemical trap; a selective trap; a scrubber; a trap; a cryotrap; a valve; a gas chromatograph; a liquid chromatograph; an ion chromatography device; a capillary electrophoresis device or capillary electrochromatograph; and/or a distillation device.

27. The system of any preceding clause, wherein the analyser comprises any one or more of: a concentration-dependent detector; a mass spectrometer; an isotope ratio mass spectrometer (IRMS); an electron capture detector; a thermal conductivity detector; a flame ionisation detector; and/or an ultraviolet-visible spectroscopy device.

28. The system of any preceding clause, further comprising one or more amplifiers configured to amplify the measurement obtained by the analyser on: the first fraction of the sample; and/or the second fraction of the sample.

29. The system of any preceding clause, configured to separate any one or more of the following analytes from the sample: $N_2$; $CO_2$; CO; $SO_2$; $H_2$: a gaseous mixture of $CO_2$ and He; $SF_6$, $CH_4$; $NO_x$ (x=1, 2, or 0.5); Ar; and/or $O_2$.

30. The system of any preceding clause, wherein the system comprises any one or more of:

a sample preparation device configured to provide the sample to the separator and the bypass line;

an elemental analyser-isotope ratio mass spectrometry system (EA-IRMS);

an automated carbonate reaction device;

an analyte source configured to provide analyte peaks, preferably wherein the analyte source comprises any one or more of: a trap; cryotrap; a valve; a gas chromatograph; a liquid chromatograph; a scrubber; an ion chromatography device; a capillary electrophoresis device or capillary electrochromatograph; a distillation device; a loop injector; a laser ablator; temperature conversion elemental analyser (TC/EA); and/or a headspace vial.

31. A method for separating an analyte from a sample, comprising:

providing a first fraction of the sample to an analyser for measurement without passing through a separator, the analyser being downstream of the separator;

receiving a measurement obtained by the analyser on the first fraction of the sample, the measurement indicating that the first fraction of the sample comprises a threshold quantity of the analyte; and controlling activation of the separator based on the received measurement.

32. The method of clause 31, wherein controlling activation of the separator comprises any one or more of:

activating the separator based on the received measurement indicating that the first fraction of the sample comprises greater than or equal to a lower threshold quantity of the analyte;

determining a time period based on the received measurement and deactivating the separator after the determined time period; and/or deactivating the separator based on the received measurement indicating that the first fraction of the sample comprises less than or equal to an upper threshold quantity of the analyte.

33. The method of clause 31 or clause 32, wherein controlling activation of the separator comprises determining a time period based on the received measurement and deactivating the separator after the determined time period, the method further comprising determining the time period by:

identifying, based on the received measurement, a peak having a peak height; and determining, based on the peak height, a value for the time period that corresponds with a predicted peak width of the peak.

The invention claimed is:

1. A system for separating an analyte from a sample, comprising:

a separator configured to separate the analyte from the sample;

an analyser configured to obtain measurements indicative of a quantity of the analyte in the sample, wherein the analyser is downstream of the separator;

a bypass line configured to provide a first fraction of the sample to the analyser for measurement without passing through the separator; and a controller configured to:

receive a measurement obtained by the analyser on the first fraction of the sample received via the bypass line, the measurement indicating that the first fraction of the sample received via the bypass line comprises a threshold quantity of the analyte; and control activation of the separator based on the received measurement;

wherein the system is configured to provide a second fraction of the sample to the analyser without passing through the bypass line and is configured such that the first fraction of the sample arrives at the analyser before the second fraction of the sample arrives at the separator.

2. The system of claim 1, wherein the controller is configured to activate the separator based on the received measurement indicating that the first fraction of the sample comprises greater than or equal to a lower threshold quantity of the analyte.

3. The system of claim 2, wherein the controller is configured to:

determine a time period based on the received measurement; and deactivate the separator after the determined time period.

4. The system of claim 3, wherein the controller is configured to determine the time period based on: an intensity of the received measurement; and/or a calibration peak having a known relationship between measurement intensity and peak width.

5. The system of claim 1, wherein the controller is configured to deactivate the separator based on the received measurement indicating that the first fraction of the sample comprises less than or equal to an upper threshold quantity of the analyte.

6. The system of claim 1, wherein the controller is configured to:

receive a plurality of measurements obtained by the analyser on the first fraction of the sample at different times; and control activation of the separator based on each of the received measurements;

preferably wherein:

the controller is configured to activate the separator based on a first received measurement indicating that the first fraction of the sample comprises at least a lower threshold quantity of the analyte; and the controller is configured to deactivate the separator based on a second received measurement, received after the first received measurement, indicating that the first fraction of the sample comprises less than or equal to an upper threshold quantity of the analyte.

7. The system of claim 1, wherein the bypass line is configured to continuously provide the first fraction of the sample to the analyser for measurement without passing through the separator.

8. The system of claim 1, wherein the first fraction of the sample comprises a first percentage of the sample, wherein the first percentage is:

less than or equal to 1%; less than or equal to 2%; less than or equal to 5%; or less than or equal to 10%.

9. The system of claim 1, wherein the system is configured such that the second fraction of the sample passes through the separator.

10. The system of claim 1, further comprising a splitter upstream of the separator, the analyser and the bypass line, wherein the splitter is configured to split the sample into the first fraction and the second fraction section fractions of the sample.

11. The system of claim 1, further comprising an outlet, wherein the controller is configured to cause the outlet to discard or transport away a portion of the second fraction of the sample that passes through the separator while the separator is activated.

12. The system of claim 1, further comprising a delay line configured to delay the second fraction of the sample relative to the first fraction of the sample.

13. The system of claim 12, wherein the delay line comprises a capillary tube dimensioned to delay the second fraction of the sample relative to the first fraction of the sample.

14. The system of claim 1, wherein:

the separator comprises a trap; and the controller is configured to deactivate the trap to release at least a portion of the second fraction of the sample to the analyser, based on the received measurement indicating that the first fraction of the sample comprises less than or equal to an upper threshold quantity of the analyte.

15. The system of claim 1, wherein the second fraction of the sample comprises a second percentage of the sample, wherein the second percentage is: greater than or equal to 90%; greater than or equal to 95%; greater than or equal to 98%; or greater than or equal to 99%.

16. The system of claim 1, configured such that a majority of the sample is provided to the analyser without passing through the bypass line.

17. The system of claim 1, comprising one or more further separators.

18. The system of claim 17, wherein at least one further separator is upstream of the bypass line, preferably wherein at least two further separators are upstream of the bypass line.

19. The system of claim 17, wherein the bypass line comprises at least one further separator, preferably wherein the bypass line comprises a trap or a selective trap.

20. The system of claim 17, wherein at least one further separator is downstream of the separator, preferably wherein the system comprises a further bypass line configured to provide a further fraction of the sample to the analyser for measurement without passing through the further separator.

21. The system of claim 17, wherein the one or more further separators comprise any one or more of: a gas chromatograph; a liquid chromatograph; a cryotrap; a chemical trap; a selective trap; a scrubber; a trap; a cryotrap; a valve; a gas chromatograph; a liquid chromatograph; an ion chromatography device; a capillary electrophoresis device or capillary electrochromatograph; and/or a distillation device.

22. The system of claim 1, wherein the system comprises a plurality of separators and the controller is configured to control activation of one, a plurality, or all of the separators based on measurements received from the analyser.

23. The system of claim 1, further comprising an interface for the analyser, the interface comprising a first port and a second port, wherein:

the first port is configured to receive the first fraction of the sample and to provide the first fraction of the sample to the analyser; and the second port is configured to receive the second fraction of the sample and to provide the second fraction of the sample to the analyser, wherein the first port is a relatively low flow port and the second port is a relatively high flow port.

24. The system of claim 23, wherein the controller is configured to deactivate the first port and to activate the second port when the received measurement indicates that the first fraction of the sample comprises less than or equal to an upper threshold quantity of the analyte.

25. The system of claim 1, wherein the separator comprises any one or more of: a gas chromatograph; a liquid chromatograph; a cryotrap; a chemical trap; a selective trap; a scrubber; a trap; a cryotrap; a valve; a gas chromatograph; a liquid chromatograph; an ion chromatography device; a capillary electrophoresis device or capillary electrochromatograph; and/or a distillation device.

26. The system of claim 1, wherein the analyser comprises any one or more of: a concentration-dependent detector; a mass spectrometer; an isotope ratio mass spectrometer (IRMS); an electron capture detector; a thermal conductivity detector; a flame ionisation detector; and/or an ultraviolet-visible spectroscopy device.

27. The system of claim 1, further comprising one or more amplifiers configured to amplify the measurement obtained by the analyser on: the first fraction of the sample; and/or the second fraction of the sample.

28. The system of claim 1, configured to separate any one or more of the following analytes from the sample: $N_2$; $CO_2$; CO; $SO_2$; $H_2$; a gaseous mixture of $CO_2$ and He; $SF_6$, $CH_4$; $NO_x$ (x=1, 2, or 0.5); Ar; and/or $O_2$.

29. The system of claim 1, wherein the system comprises any one or more of:

a sample preparation device configured to provide the sample to the separator and the bypass line;

an elemental analyser-isotope ratio mass spectrometry system (EA-IRMS);

an automated carbonate reaction device;

an analyte source configured to provide analyte peaks, preferably wherein the analyte source comprises any one or more of: a trap; cryotrap; a valve; a gas chromatograph; a liquid chromatograph; a scrubber; an ion chromatography device; a capillary electrophoresis device or capillary electrochromatograph; a distillation device; a loop injector; a laser ablator; temperature conversion elemental analyser (TC/EA); and/or a headspace vial.

30. A method for separating an analyte from a sample, comprising:

providing a first fraction of the sample via a bypass line to an analyser for measurement without passing through a separator, the analyser being downstream of the separator;

providing a second fraction of the sample to the analyser without passing through the bypass line, the first fraction of the sample arriving at the analyser before the second fraction of the sample arrives at the separator;

receiving a measurement obtained by the analyser on the first fraction of the sample, the measurement indicating that the first fraction of the sample comprises a threshold quantity of the analyte; and controlling activation of the separator based on the received measurement.

31. The method of claim 30, wherein controlling activation of the separator comprises any one or more of:

activating the separator based on the received measurement indicating that the first fraction of the sample comprises greater than or equal to a lower threshold quantity of the analyte;

determining a time period based on the received measurement and deactivating the separator after the determined time period; and/or deactivating the separator based on the received measurement indicating that the first fraction of the sample comprises less than or equal to an upper threshold quantity of the analyte.

32. The method of claim 30, wherein controlling activation of the separator comprises determining a time period based on the received measurement and deactivating the separator after the determined time period, the method further comprising determining the time period by:

identifying, based on the received measurement, a peak having a peak height; and determining, based on the peak height, a value for the time period that corresponds with a predicted peak width of the peak.

* * * * *